US012615654B2

(12) United States Patent
Fujishiro et al.

(10) Patent No.: US 12,615,654 B2
(45) Date of Patent: Apr. 28, 2026

(54) COMMUNICATION CONTROL METHOD AND RELAY NODE FOR RELAYING DATA FROM LOWER NODE TO UPPER NODE

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 711 days.

(21) Appl. No.: 17/819,194

(22) Filed: Aug. 11, 2022

(65) Prior Publication Data

US 2022/0386320 A1 Dec. 1, 2022

Related U.S. Application Data

(63) Continuation of application No. PCT/JP2021/004127, filed on Feb. 4, 2021.

(60) Provisional application No. 62/975,304, filed on Feb. 12, 2020.

(51) Int. Cl.
| | |
|---|---|
| *H04W 72/54* | (2023.01) |
| *H04W 40/00* | (2009.01) |
| *H04W 40/04* | (2009.01) |

(52) U.S. Cl.
CPC ......... *H04W 72/54* (2023.01); *H04W 40/005* (2013.01); *H04W 40/04* (2013.01)

(58) Field of Classification Search
CPC .... H04W 72/54; H04W 40/005; H04W 40/04
See application file for complete search history.

(56) References Cited

U.S. PATENT DOCUMENTS

| | | | |
|---|---|---|---|
| 2020/0196387 A1* | 6/2020 | Roy | H04W 4/80 |
| 2021/0076404 A1* | 3/2021 | Tsai | H04W 72/23 |

OTHER PUBLICATIONS

Huawei, Hisilicon; "TP for the pre-BSR"; 3GPP TSG-RAN WG2 Meeting #108; R2-1916537; Nov. 18-22, 2019; Total 7 pages; Reno, USA.

Ericsson, Sony; "Way forward on pre-emptive BSR in IAB networks"; 3GPP TSG-RAN WG2 Meeting #108; R2-1915475; Nov. 18-22, 2019; Total 6 pages; Reno, USA.

(Continued)

*Primary Examiner* — Sulaiman Nooristany
(74) *Attorney, Agent, or Firm* — Studebaker Brackett PLLC

(57) ABSTRACT

A communication control method is a method using a relay node that includes a first functional unit connecting wirelessly to a lower node and a second functional unit connecting wirelessly to the upper node and relays data from the lower node to the upper node. The communication control method includes detecting, by the second functional unit, that a predetermined event related to resource allocation to the lower node is occurred in the first functional unit, and transmitting, by the second functional unit, to the upper node, in a case of detecting occurrence of the predetermined event, a first buffer state report including size information indicating an amount of data having yet to be transmitted to the upper node. The detecting includes detecting the occurrence of the predetermined event by monitoring an event occurring in the first functional unit, or by receiving, from the first functional unit, a notification indicating that the predetermined event is occurred.

7 Claims, 17 Drawing Sheets

(56)  References Cited

OTHER PUBLICATIONS

Lenovo, Motorola Mobility; "Pre-emptive BSR in NR-DC scenario"; 3GPP TSG-RAN WG2 Meeting #108; R2-1915127; Nov. 18-22, 2019; Total 4 pages; Reno, Nevada, USA.
Kyocera; "Remaining issue of pre-emptive BSR in IAB"; 3GPP TSG-RAN WG2 #109-e; R2-2000514; Feb. 24-Mar. 6, 2020; Total 6 pages.

* cited by examiner

SHORT PREEMPTIVE BSR

| LCG ID | Buffer Size | Time |
|--------|-------------|------|
|        |             |      |

LONG PREEMPTIVE BSR

| LCG7 | LCG6 | LCG5 | LCG4 | LCG3 | LCG2 | LCG1 | LCG0 |
|------|------|------|------|------|------|------|------|
| Buffer Size 1 | | | | | | Time 1 | |
| Buffer Size 2 | | | | | | Time 2 | |

. . .

| Buffer Size m | Time m |
|---------------|--------|
|               |        |

FIG. 12

UPPER LIMIT  "00001111"

| LCG7 | LCG6 | LCG5 | LCG4 | LCG3 | LCG2 | LCG1 | LCG0 |
|------|------|------|------|------|------|------|------|
| Buffer Size 1 | | | | Buffer Size 2 | | | |
| · · · | | | | Buffer Size m | | | |

UPPER LIMIT  "00000111"

| LCG7 | LCG6 | LCG5 | LCG4 | LCG3 | LCG2 | LCG1 | LCG0 |
|------|------|------|------|------|------|------|------|
| Buffer Size 1 | | | Buffer Size 2 | | | Buffer Size 3 | |
| Buffer Size 3 | · · · | | | | | Buffer Size m | |

FIG. 14

COMMUNICATION CONTROL METHOD AND RELAY NODE FOR RELAYING DATA FROM LOWER NODE TO UPPER NODE

RELATED APPLICATIONS

The present application is a continuation based on PCT Application No. PCT/JP2021/004127, filed on Feb. 4, 2021, which claims the benefit of U.S. Provisional Patent Application No. 62/975,304 filed on Feb. 12, 2020. The content of which is incorporated by reference herein in their entirety.

TECHNICAL FIELD

The present disclosure relates to a communication control method and a relay node that are used in a mobile communication system.

BACKGROUND ART

In the 3rd Generation Partnership Project (3GPP), which is a standardization project of a mobile communication system, a new relay node referred to as an Integrated Access and Backhaul (IAB) node has been under study. One or a plurality of relay nodes are involved in communication between a donor base station and a user equipment and perform relay for the communication.

Such a relay node includes a second functional unit and a first functional unit, performs wireless communication with an upper node (a base station or an upper relay node) by using the second functional unit, and performs wireless communication with a lower node (a user equipment or a lower relay node) by using the first functional unit.

SUMMARY OF INVENTION

A communication control method according to a first aspect is a method using a relay node that includes a first functional unit connecting wirelessly to a lower node and a second functional unit connecting wirelessly to an upper node and relays data from the lower node to the upper node. The communication control method includes detecting, by the second functional unit, that a predetermined event related to resource allocation to the lower node is occurred in the first functional unit, and transmitting, by the second functional unit, to the upper node, in a case of detecting occurrence of the predetermined event, a first buffer state report including size information indicating an amount of data having yet to be transmitted to the upper node. The detecting includes detecting the occurrence of the predetermined event by monitoring an event occurring in the first functional unit, or by receiving, from the first functional unit, a notification indicating that the predetermined event is occurred.

A relay node according to a second aspect is an apparatus relaying data from a lower node to an upper node. The relay node includes a first functional unit connecting wirelessly to the lower node, and a second functional unit connecting wirelessly to the upper node. The second functional unit executes processing for detecting that a predetermined event related to resource allocation to the lower node is occurred in the first functional unit, and processing for transmitting, to the upper node, in a case of detecting occurrence of the predetermined event, a first buffer state report including size information indicating an amount of data having yet to be transmitted to the upper node. The processing for detecting includes processing for detecting the occurrence of the predetermined event by monitoring an event occurring in the first functional unit, or by receiving, from the first functional unit, a notification indicating that the predetermined event is occurred.

BRIEF DESCRIPTION OF DRAWINGS

FIG. 12 is a diagram illustrating Format Example 1 of the preemptive BSR according to an embodiment.

FIG. 14 is a diagram illustrating Format Example 2 of the preemptive BSR according to an embodiment.

DESCRIPTION OF EMBODIMENTS

A mobile communication system according to an embodiment will be described with reference to the drawings. In the description of the drawings, the same or similar parts are denoted by the same or similar reference signs.

Configuration of Mobile Communication System

Figure 1:
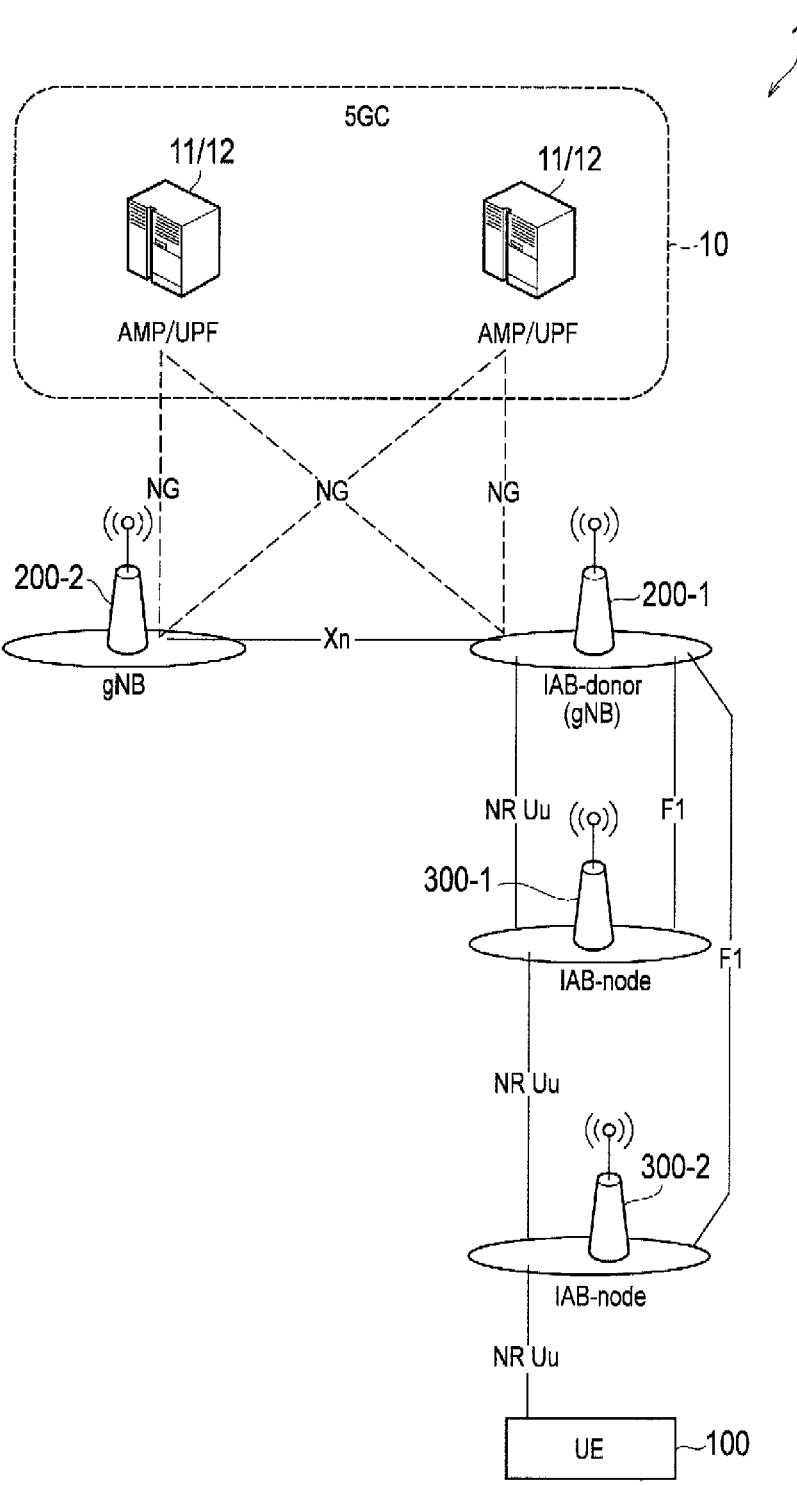
FIG. 1 is a diagram illustrating a configuration of a mobile communication system according to an embodiment.

First, a configuration of a mobile communication system according to an embodiment will be described. FIG. 1 is a diagram illustrating a configuration of the mobile communication system 1 according to an embodiment.

The mobile communication system 1 is a fifth generation (5G) mobile communication system based on the 3GPP standard. Specifically, a radio access scheme in the mobile communication system 1 is New Radio (NR) being a radio access scheme of 5G. Note that Long Term Evolution (LTE) may be at least partially applied to the mobile communication system 1.

As illustrated in FIG. 1, the mobile communication system 1 includes a 5G core network (5GC) 10, a user equipment (UE) 100, a base station (referred to as a gNB) 200, and an IAB node 300. The IAB node 300 is an example of a relay node. An embodiment mainly describes an example in which the base station is an NR base station. However, the base station may be an LTE base station (that is, an eNB).

The 5GC 10 includes an Access and Mobility Management Function (AMF) 11 and a User Plane Function (UPF) 12. The AMF 11 is an apparatus that performs various types of mobility control and the like for the UE 100. By communicating with the UE 100 by using Non-Access Stratum (NAS) signaling, the AMF 11 manages information of an area in which the UE 100 exists. The UPF 12 is an apparatus that performs transfer control of user data and the like.

Each gNB 200 is a fixed wireless communication node that manages one or a plurality of cells. The cell is used as a term denoting a minimum unit of a wireless communication area. The cell may be used as a term denoting a function or a resource for performing wireless communication with the UE 100. One cell belongs to one carrier frequency.

Each gNB 200 is connected to the 5GC 10 each other via an interface referred to as an NG interface. FIG. 1 illustrates an example of two gNBs, a gNB 200-1 and a gNB 200-2 that are connected to the 5GC 10.

Each gNB 200 is connected to another gNB 200 in an adjacency relationship via an inter-base station interface referred to as an Xn interface. FIG. 1 illustrates an example in which the gNB 200-1 is connected to the gNB 200-2.

Each gNB 200 may be divided into a central unit (CU) and a distributed unit (DU). The CU and the DU are connected to each other via an interface referred to as an F1 interface. The F1 protocol is a communication protocol between the CU and the DU and includes an F1-C protocol corresponding to a protocol for a control plane and an F1-U protocol corresponding to a protocol for a user plane.

The mobile communication system 1 supports an IAB that uses NR for the backhaul to enable wireless relay of NR access. The donor gNB 200-1 is a gNB 200 corresponding to a terminal node of the NR backhaul on the network side and including additional functions that support the IAB. The backhaul enables a multi-hop through a plurality of hops (in other words, a plurality of IAB nodes 300).

Each IAB node 300 includes a Mobile Terminal (MT) corresponding to a second functional unit and a DU corresponding to a first functional unit.

The MT is connected to the DU of an upper node (upper IAB node or a donor gNB 200-1). The MT is connected to the CU of the donor gNB 200-1 by using RRC, and establishes, with the donor gNB 200-1, a signaling radio bearer (SRB) that carries an RRC message and an NAS message. An adjacent node (that is, an upper node) on an NR Uu wireless interface of the MT may be referred to as a "parent node". A radio link between the MT of the IAB node 300 and the upper node is referred to as a backhaul link.

The DU manages cells similarly to the gNB 200. The DU terminates the NR Uu wireless interface to the UE 100 and a lower IAB node. The DU supports the F1 protocol for the CU of the donor gNB 200-1. An adjacent node (that is, a lower node) on an NR access interface of the DU may be referred to as a "child node".

All IAB nodes 300 connected to the donor gNB 200-1 via one or a plurality of hops form a Directed Acyclic Graph (DAG) topology rooted in the donor gNB 200-1. The DAG topology may be referred to as an IAB topology. In the DAG topology, the direction of the parent node may be referred to as upstream or upper, and the direction of the child node may be referred to as downstream or lower.

An example is illustrated in FIG. 1 in which the IAB node 300-1 is wirelessly connected to the donor gNB 200-1, the IAB node 300-2 is wirelessly connected to the IAB node 300-1, and the F1 protocol is transmitted via two backhaul hops.

The UE 100 is a movable wireless communication apparatus that performs wireless communication with cells. The UE 100 may be any type of apparatus as long as the apparatus performs wireless communication with the gNB 200 or the IAB node 300. For example, the UE 100 is a mobile phone terminal, a tablet terminal, a notebook PC, a sensor or an apparatus provided in the sensor, and/or a vehicle or an apparatus provided in the vehicle. The UE 100 is wirelessly connected to the upper node (IAB node 300 or gNB 200) via an access link.

FIG. 1 illustrates an example in which the UE 100 is wirelessly connected to the IAB node 300-2. The UE 100 indirectly communicates with the donor gNB 200-1 via the IAB node 300-2 and the IAB node 300-1. Specifically, the IAB node 300-2 and the IAB node 300-1 relay uplink data from the UE 100 to the donor gNB 200-1 and relay downlink data from the gNB 200-1 to the UE 100.

Figure 2:
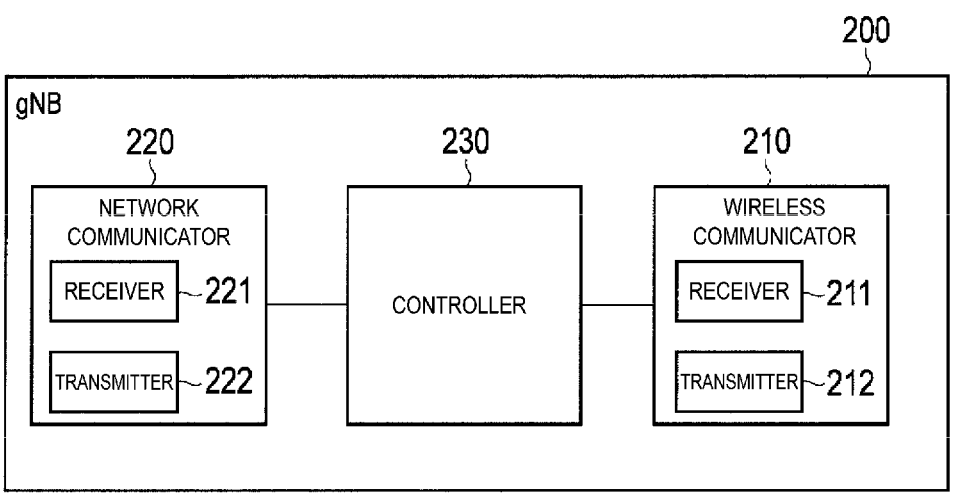
FIG. 2 is a diagram illustrating a configuration of a gNB according to an embodiment.

Now, a configuration of the gNB 200, corresponding to a base station according to an embodiment, will be described. FIG. 2 is a diagram illustrating a configuration of the gNB 200. As illustrated in FIG. 2, the gNB 200 includes a wireless communicator 210, a network communicator 220, and a controller 230.

The wireless communicator 210 performs wireless communication with the UE 100 and performs wireless communication with the IAB node 300. The wireless communicator 210 includes a receiver 211 and a transmitter 212. The receiver 211 performs various kinds of receptions under control of the controller 230. The receiver 211 includes an antenna and converts a radio signal received by the antenna into a baseband signal (received signal) and outputs the baseband signal to the controller 230. The transmitter 212 performs various kinds of transmissions under control of the controller 230. The transmitter 212 includes an antenna and converts a baseband signal (transmission signal) to be output by the controller 230 into a radio signal and transmits the radio signal from the antenna.

The network communicator 220 performs wired communication (or wireless communication) with the 5GC 10 and performs wired communication (or wireless communication) with another neighboring gNB 200. The network communicator 220 includes a receiver 221 and a transmitter 222. The receiver 221 performs various kinds of receptions under control of the controller 230. The receiver 221 receives a signal from the outside and outputs the received signal to the controller 230. The transmitter 222 performs various kinds of transmissions under control of the controller 230. The transmitter 222 transmits a transmission signal output by the controller 230 to the outside.

The controller 230 performs various types of control for the gNB 200. The controller 230 includes at least one memory and at least one processor electrically connected to the memory. The memory stores programs to be executed by the processor and information to be used for processes by the processor. The processor may include a baseband processor and a Central Processing Unit (CPU). The baseband processor performs modulation and demodulation of a baseband signal, coding and decoding of the baseband signal, and the like. The CPU executes the programs stored in the memory to perform various types of processes. The processor executes processing of the layers described below.

Figure 3:
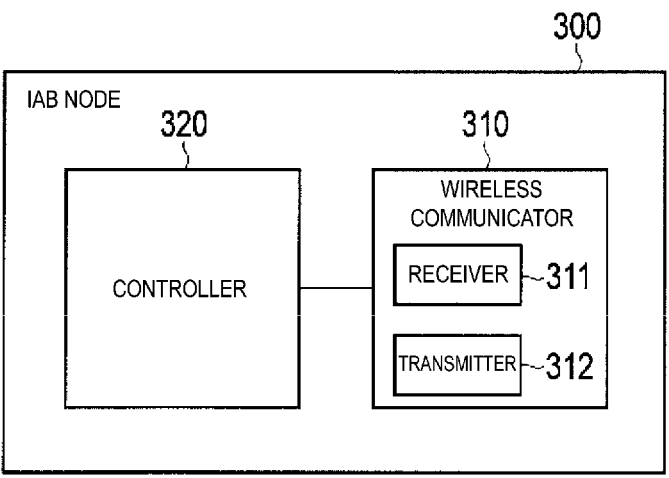
FIG. 3 is a diagram illustrating a configuration of an IAB node according to an embodiment.

Now, a configuration of the IAB node 300, used as a relay node according to an embodiment will be described. FIG. 3 is a diagram illustrating a configuration of the IAB node 300. As illustrated in FIG. 3, the IAB node 300 includes a wireless communicator 310 and a controller 320. The IAB node 300 may include a plurality of wireless communicators 310.

The wireless communicator 310 performs wireless communication (backhaul link) with the gNB 200 and performs wireless communication (access link) with the UE 100. The wireless communicator 310 for the backhaul link communication and the wireless communicator 310 for the access link communication may be provided separately.

The wireless communicator 310 includes a receiver 311 and a transmitter 312. The receiver 311 performs various kinds of receptions under control of the controller 320. The receiver 311 includes an antenna and converts a radio signal received by the antenna into a baseband signal (received signal) and outputs the baseband signal to the controller 320. The transmitter 312 performs various kinds of transmissions under control of the controller 320. The transmitter 312 includes an antenna and converts a baseband signal (transmission signal) output by the controller 320 into a radio signal and transmits the radio signal from the antenna.

The controller 320 performs various types of control in the IAB node 300. The controller 320 includes at least one memory and at least one processor electrically connected to the memory. The memory stores programs to be executed by the processor and information to be used for processes by the processor. The processor may include a baseband processor and a CPU. The baseband processor performs modulation and demodulation of a baseband signal, coding and decoding of the baseband signal, and the like. The CPU executes the programs stored in the memory to perform various types of processes. The processor executes processing of the layers described below.

Figure 4:
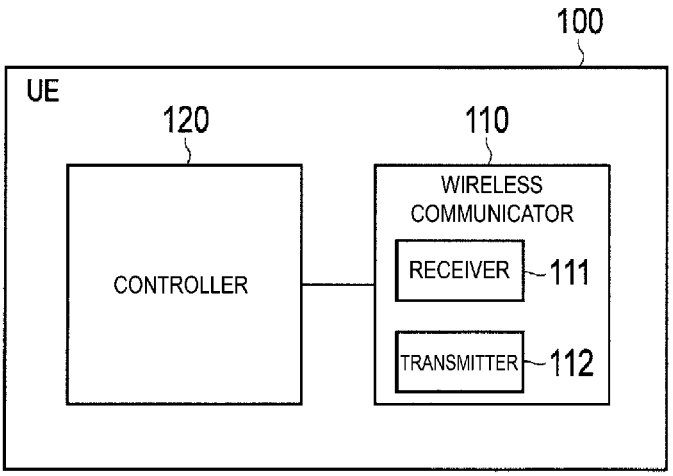
FIG. 4 is a diagram illustrating a configuration of a UE according to an embodiment.

Now, a configuration of the UE 100, corresponding to a user equipment according to an embodiment, will be described. FIG. 4 is a diagram illustrating a configuration of the UE 100. As illustrated in FIG. 4, the UE 100 includes a wireless communicator 110 and a controller 120.

The wireless communicator 110 performs wireless communication on the access link, in other words, wireless communication with the gNB 200 and wireless communication with the IAB node 300. The wireless communicator 110 may perform wireless communication on the side link, in other words, wireless communication with another UE 100. The wireless communicator 110 includes a receiver 111 and a transmitter 112. The receiver 111 performs various kinds of receptions under control of the controller 120. The receiver 111 includes an antenna and converts a radio signal received by the antenna into a baseband signal (received signal) and outputs the baseband signal to the controller 120. The transmitter 112 performs various kinds of transmissions under control of the controller 120. The transmitter 112 includes an antenna and converts a baseband signal (transmission signal) output by the controller 120 into a radio signal and transmits the radio signal from the antenna.

The controller 120 performs various kinds of control for the UE 100. The controller 120 includes at least one memory and at least one processor electrically connected to the memory. The memory stores programs to be executed by the processor and information to be used for processes by the processor. The processor may include a baseband processor and a CPU. The baseband processor performs modulation and demodulation of a baseband signal, coding and decoding of the baseband signal, and the like. The CPU executes the programs stored in the memory to perform various types of processes. The processor executes processing of the layers described below.

Figure 5:
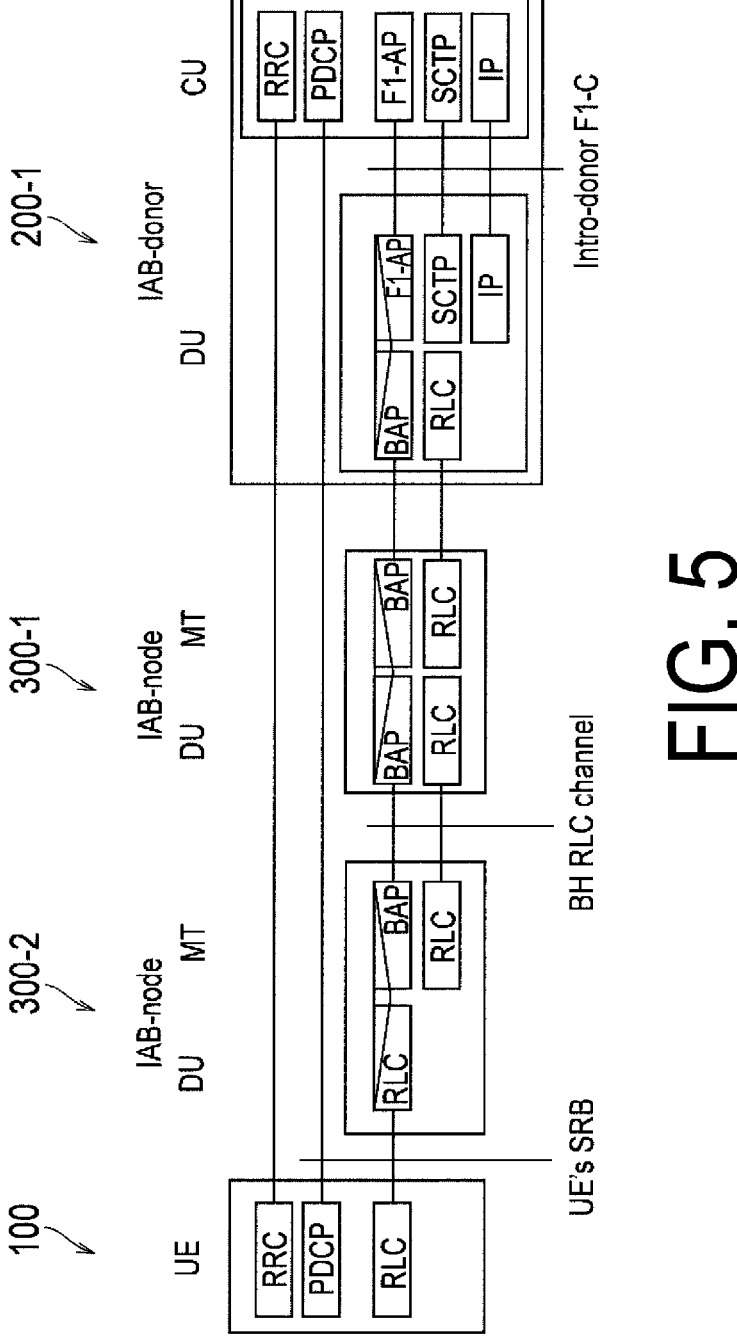
FIG. 5 is a diagram illustrating an example of a protocol stack in a configuration of a mobile communication system according to an embodiment.
Figure 6:
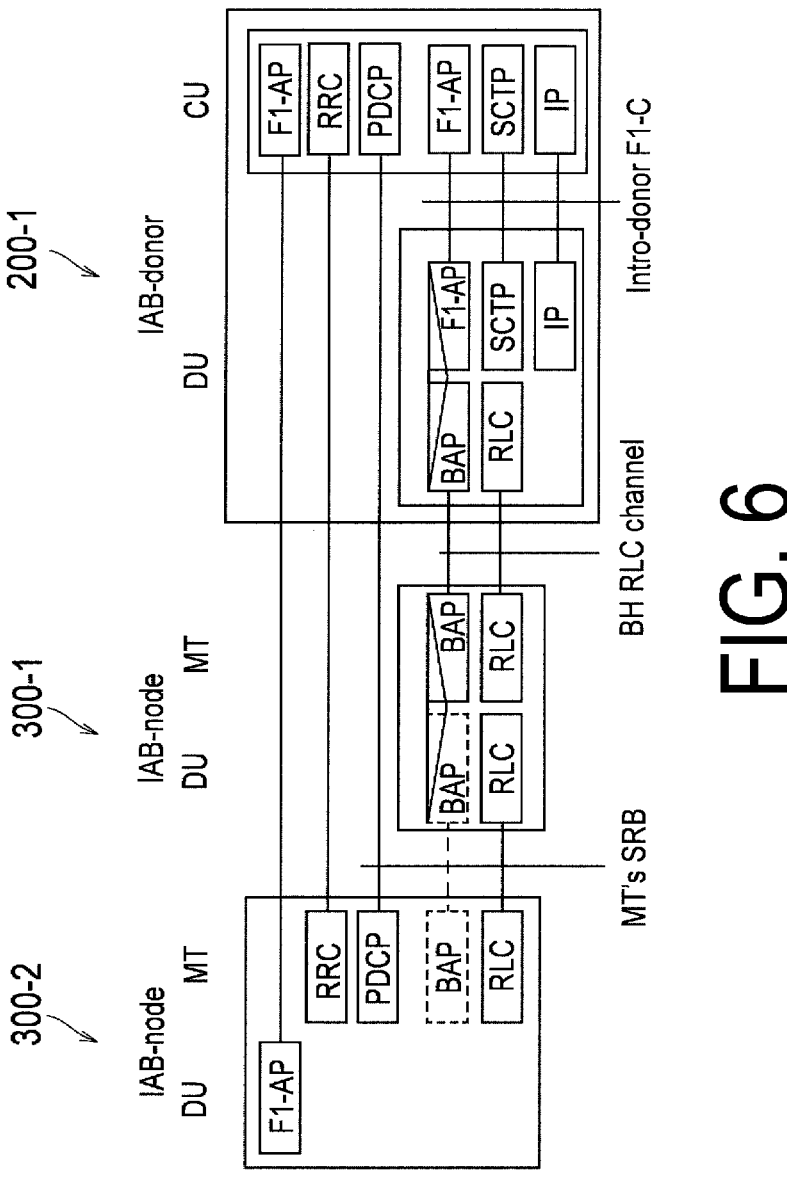
FIG. 6 is a diagram illustrating an example of a protocol stack in the configuration of the mobile communication system according to an embodiment.

Now, description will be given of an example of a protocol stack in the configuration of the mobile communication system 1 according to an embodiment. FIGS. 5 and 6 are diagrams illustrating an example of a protocol stack in the configuration of the mobile communication system 1 according to an embodiment.

In FIGS. 5 and 6, illustration of the Medium Access Control (MAC) layer and the Physical layer (PHY), which are lower layers of the Radio Link Control (RLC) layer, is omitted. Note that the PHY layer is a layer that performs coding and decoding, modulation and demodulation, mapping and demapping of antennas, and mapping and demapping of resources. Data and control information are transmitted between the PHY layers via a physical channel. The MAC layer performs priority control of data, retransmission process through a hybrid ARQ (HARM), and the like. Data and control information are transmitted between the MAC layers via a transport channel. The MAC layer of the DU includes a scheduler. The scheduler executes scheduling processing to determine a transport format (a transport block size, a modulation and coding scheme (MCS)) for uplink and downlink, and an allocation resource block (allocation radio resource) for the UE 100.

As illustrated in FIG. 5, the donor gNB 200-1 is divided into the CU and the DU, and includes an F1-C interface (Intra-donor F1-C) between the CU and the DU. The Packet Data Convergence Protocol (PDCP) layer of the CU and the PDCP layer of the UE 100 communicate with each other via the IAB nodes 300-1 and 300-2. The PDCP layer is a layer that performs header compression and decompression, and encryption and decryption. The Radio Resource Control (RRC) layer of the CU and the RRC layer of the UE 100 communicate with each other via the IAB nodes 300-1 and 300-2. The RRC layer transmits RRC signaling for various configurations. The RRC layer controls the logical channel, the transport channel, and the physical channel in response to establishment, re-establishment, and release of the radio bearer. In a case where there is an RRC connection between the RRC layers, the UE 100 is in an RRC connected state. In a case where there is no RRC connection between the RRC layers, the UE 100 is in an RRC idle state.

In the DU and the MT, a Backhaul Adaptation Protocol (BAP) layer is provided as an upper layer of the RLC layer. The BAP layer is a layer that executes routing processing and bearer mapping and demapping processing. Note that the DUs of the UE 100 and the IAB node 300-2 include no BAP layer.

As illustrated in FIG. 6, the F1-Application Protocol (F1-AP) layer of the CU and the F1-AP layer of the DU of the IAB node 300-2 communicate with each other via the IAB node 300-1. The RRC layer of the CU and the RRC layer of the MT of the IAB node 300-2 communicate with each other via the IAB node 300-1. The PDCP layer of the CU and the PDCP layer of the MT of the IAB node 300-2 communicate with each other via the IAB node 300-1.

Note that although not illustrated in FIG. 6, the F1-AP layer of the CU and the F1-AP layer of the DU of the IAB node 300-1 communicate with each other. The RRC layer of the CU and the RRC layer of the MT of the IAB node 300-1 communicate with each other. The PDCP layer of the CU and the PDCP layer of the MT of the IAB node 300-1 communicate with each other.

In such a configuration, the UE 100 transmits data to the DU of the IAB node 300-2 by using uplink radio resources allocated by the DU of the IAB node 300-2. The MT of the IAB node 300-2 transmits data from UE 100 to the DU of the IAB node 300-1 by using uplink radio resources allocated by the DU of the IAB node 300-1. The MT of the IAB node 300-1 transmits data from the IAB node 300-2 to the DU of the donor gNB 200-1 by using uplink radio resources allocated by the DU of the donor gNB 200-1. Note that the uplink radio resources may be time and frequency resources, particularly Physical Uplink Shared CHannel (PUSCH) resources.

Thus, it is important that each upper node (specifically, each DU) allocates an appropriate amount of uplink radio resources at an appropriate timing for the lower node. For example, in a case that the uplink radio resources are allocated at an excessively late timing, or an excessively small amount of uplink radio resources are allocated, a delay occurs in data relay from the UE 100 to the donor gNB 200-1, degrading communication quality. On the other hand, in a case that the uplink radio resources are allocated at an excessively early timing, or an excessively large amount of uplink radio resources are allocated, the allocated uplink radio resources are wasted, causing a decrease in resource utilization efficiency.

In an embodiment, to enable the uplink radio resources to be allocated appropriately, a preemptive BSR is introduced that corresponds to a type of buffer state report (BSR).

Preemptive BSR

Figure 7:
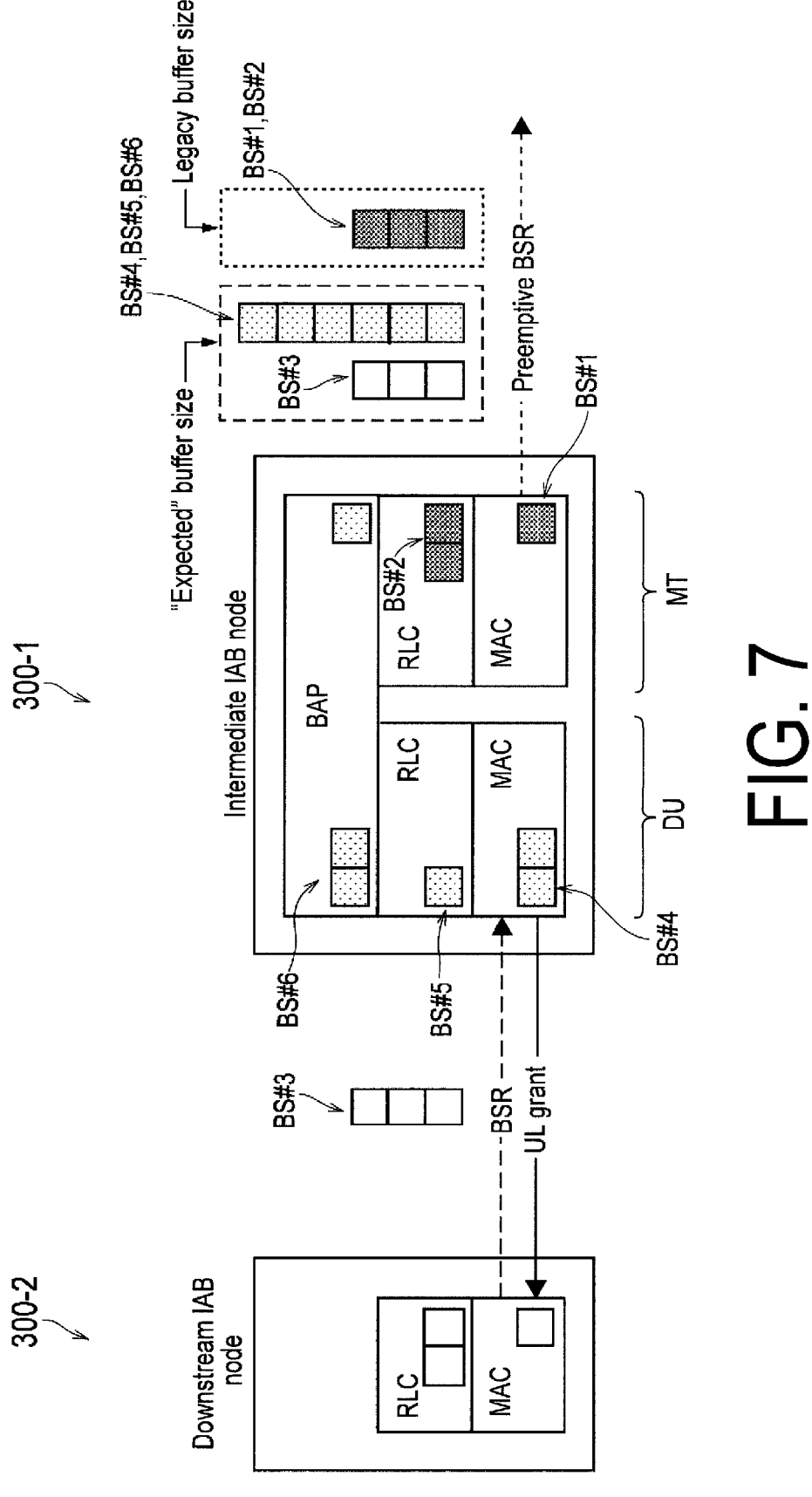
FIG. 7 is a diagram illustrating operations related to a preemptive BSR according to an embodiment.

Now, a preemptive BSR according to an embodiment will be described. FIG. 7 is a diagram illustrating operations related to the preemptive BSR according to an embodiment.

As illustrated in FIG. 7, an IAB node 300-1 is an Intermediate IAB node, and an IAB node 300-2 is a Downstream IAB node.

The description below mainly assumes that a lower node of the IAB node 300-1 is a lower IAB node, but the lower node of the IAB node 300-1 may be the UE 100. The description below mainly assumes that an upper node of the IAB node 300-1 is the donor gNB 200-1, but the upper node of the IAB node 300-1 may be an upper IAB node. In other words, at least one IAB node may be interposed between the IAB node 300-1 and the donor gNB 200-1.

The IAB node 300-1 includes a DU wirelessly connected to the IAB node 300-2, and an MT wirelessly connected to the upper node, and relays uplink data from the IAB node 300-2 to the upper node. In an embodiment, the MAC layer of the MT transmits, to the upper node, a Preemptive BSR indicating the amount of uplink data having yet to be transmitted.

Generally, a BSR transmitted by the UE 100 (hereinafter referred to as the "legacy BSR" as appropriate) indicates, for each logical channel group (LCG), the amount of uplink data having yet to be transmitted by each of the MAC, RLC, and PDCP layers (that is, an uplink buffer amount). Each LCG is a group including at least one logical channel and configured by priority. The legacy BSR has two formats, i.e., a short BSR and a long BSR. The short BSR includes a field in which the ID of the LCG is stored, and a buffer size field in which size information indicating the amount of uplink data having yet to be transmitted is stored. The long BSR includes a field in which a bit string indicating the presence or absence of a buffer size field for each LCG is stored and a plurality of buffer size fields. Based on the BSR from UE 100, the gNB 200 determines, for each LCG, the amount of uplink data having yet to be transmitted by the UE 100 and performs scheduling such that the UE 100 is allocated uplink radio resources commensurate with the amount of uplink data having yet to be transmitted.

On the other hand, the IAB node 300-1 includes the DU (the first functional unit) as well as the MT (the second functional unit), and the IAB node 300-2 may be present that is connected to the DU. Thus, when only the amount of uplink data having yet to be transmitted (Legacy buffer size) by the MT of the IAB node 300-1 is reported to the upper node, the upper node cannot perform scheduling in consideration of the potential amount of uplink data having yet to be transmitted (Expected buffer size). This poses a problem in that shortage or delay occurs in allocation of uplink radio resources to the IAB node 300-2.

Thus, the preemptive BSR is intended to reflect at least one of the amount of data remaining in the DU of the IAB node 300-1 or the amount of uplink data having yet to be transmitted by the IAB node 300-2 connected to the DU. In this way, the upper node can perform scheduling in consideration of the potential amount of uplink data having yet to be transmitted, suppressing possible shortage or delay in allocation of the uplink radio resources. For example, in a case that no radio resources are allocated to a backhaul link (that is, MT) of the IAB node 300-1, transmitting the preemptive BSR allows a scheduling request to be transmitted to the upper node. The transmission of the scheduling request allows the appropriate radio resource allocation to be prepared before the actual uplink data reaches the transmission system protocol of the MT (that is, RLC, MAC).

The amount of uplink data having yet to be transmitted, indicated by the preemptive BSR, has variations A) to C) as below.

A) The preemptive BSR indicates each of the amount of uplink data having yet to be transmitted by the IAB node 300 and the amount of uplink data having yet to be transmitted by the lower node connected to the IAB node 300.

Figure 8:
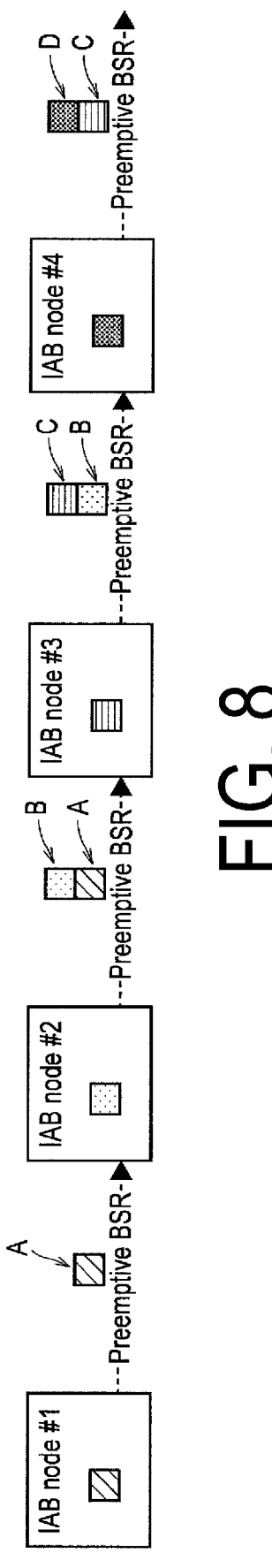
FIG. 8 is a diagram illustrating Configuration Example 1 of the preemptive BSR according to an embodiment.

FIG. 8 is a diagram illustrating Configuration Example 1 of the preemptive BSR according to an embodiment. As illustrated in FIG. 8, an IAB node #1 transmits, to the IAB node #2, a preemptive BSR indicating the amount A of uplink data having yet to be transmitted by the IAB node #1.

The IAB node #2 transmits, to the IAB node #3, a preemptive BSR indicating the amount B of uplink data having yet to be transmitted by the IAB node #2 and the amount A of uplink data having yet to be transmitted by the IAB node #1.

The IAB node #3 transmits, to the IAB node #4, a preemptive BSR indicating the amount C of uplink data having yet to be transmitted by the IAB node #3 and the amount B of uplink data having yet to be transmitted by the IAB node #2.

The IAB node #4 transmits, to the upper node, a preemptive BSR indicating the amount D of uplink data having yet to be transmitted by the IAB node #4 and the amount C of uplink data having yet to be transmitted by the IAB node #3.

B) The preemptive BSR indicates each of the amount of uplink data having yet to be transmitted by the IAB node 300, the amount of uplink data having yet to be transmitted by the lower node connected to the IAB node 300, and the amount of uplink data having yet to be transmitted by a further lower node of the lower node.

Figure 9:
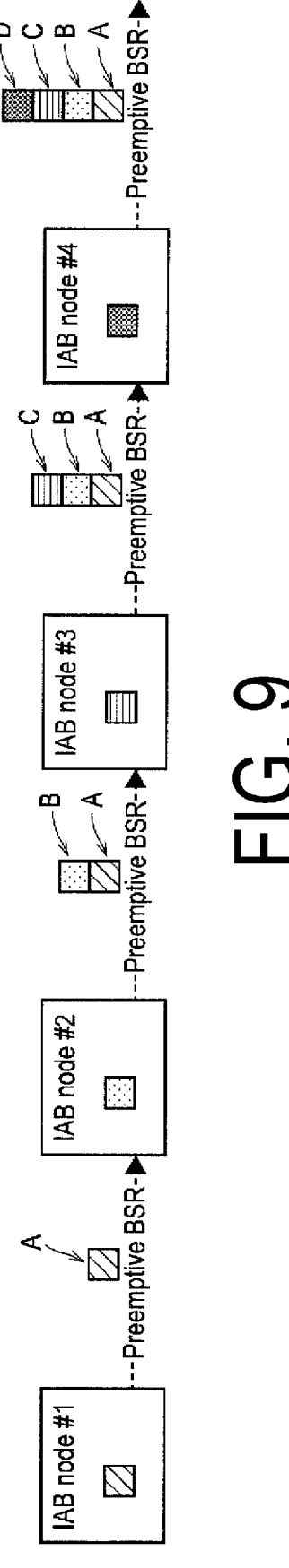
FIG. 9 is a diagram illustrating Configuration Example 2 of the preemptive BSR according to an embodiment.

FIG. 9 is a diagram illustrating Configuration Example 2 of the preemptive BSR according to an embodiment. As illustrated in FIG. 9, the IAB node #1 transmits, to the IAB node #2, a preemptive BSR indicating the amount A of uplink data having yet to be transmitted by the IAB node #1.

The IAB node #2 transmits, to the IAB node #3, a preemptive BSR indicating the amount B of uplink data having yet to be transmitted by the IAB node #2 and the amount A of uplink data having yet to be transmitted by the IAB node #1.

The IAB node #3 transmits, to the IAB node #4, a preemptive BSR indicating the amount C of uplink data having yet to be transmitted by the IAB node #3, the amount B of uplink data having yet to be transmitted by the IAB node #2, and the amount A of uplink data having yet to be transmitted by the IAB node #1.

The IAB node #4 transmits, to the upper node, a preemptive BSR indicating the amount D of uplink data having yet to be transmitted by the IAB node #4, the amount C of uplink data having yet to be transmitted by the IAB node #3, the amount B of uplink data having yet to be transmitted by the IAB node #2, and the amount A of uplink data having yet to be transmitted by the IAB node #1.

In the configuration of the preemptive BSR described above, the preemptive BSR may be a new MAC CE having a format different from that of the legacy BSR. The format of the preemptive BSR may include individual buffer size fields in which the amount of uplink data having yet to be transmitted by each node is stored.

C) The preemptive BSR indicates the amount of uplink data having yet to be transmitted by the lower node connected to the IAB node 300 without indicating the amount of uplink data having yet to be transmitted by the IAB node 300.

For example, in a case that the preemptive BSR and the legacy BSR are used in combination, the legacy BSR can be used to indicate, to the upper node, the amount of uplink data having yet to be transmitted by the IAB node 300, and the preemptive BSR can be used to indicate the amount of uplink data having yet to be transmitted by the lower node. Thus, the IAB node 300 may use the preemptive BSR only as a report of the amount of uplink data having yet to be transmitted by the lower node. Similar to B) described above, the preemptive BSR may indicate the amount of uplink data having yet to be transmitted by the further lower node of the lower node.

In an embodiment, the format of the preemptive BSR may be a new MAC control element (MAC CE) having a format different from that of the legacy BSR. The format of the preemptive BSR may include individual buffer size fields for the respective nodes.

Alternatively, the format of the legacy BSR may be directly used as the format of the preemptive BSR. As is the case with the legacy BSR, the format of the preemptive BSR includes the LCG identification information associated with the amount of uplink data having yet to be transmitted (buffer size field). Alternatively, the LCG identification information may be used for node identification. By using the LCG for node identification, the amount of uplink data having yet to be transmitted can be indicated for each node.

The configuration of the preemptive BSR as described above in A) will be described in detail.

As illustrated in FIG. 7, the preemptive BSR indicates data amounts BS #1 and BS #2 described below, similarly to data amounts (Legacy buffer size) indicated by the legacy BSR.

The amount BS #1 of uplink data remaining in the MAC layer of the MT.

The amount BS #2 of uplink data remaining in the RLC layer of the MT.

Furthermore, the preemptive BSR indicates at least one of data amounts BS #3 to BS #6 described below.

Data amount BS #3 indicated by the BSR from the IAB node 300-2. Alternatively, the amount BS #3' of uplink radio resources (in other words, the size of uplink grant) allocated to the IAB node 300-2 by the IAB node 300-1 in accordance with the BSR. Although an example in which the data amount BS #3 indicated by the BSR is used will be described below, the uplink grant size BS #3' may be used instead of the data amount BS #3 indicated by the BSR.

The amount BS #4 of uplink data remaining in the MAC layer of the DU.

The amount BS #5 of uplink data remaining in the RLC layer of the DU.

The amount BS #6 of uplink data remaining in the BAP layer.

Transmission Trigger for Preemptive BSR

Figure 10:
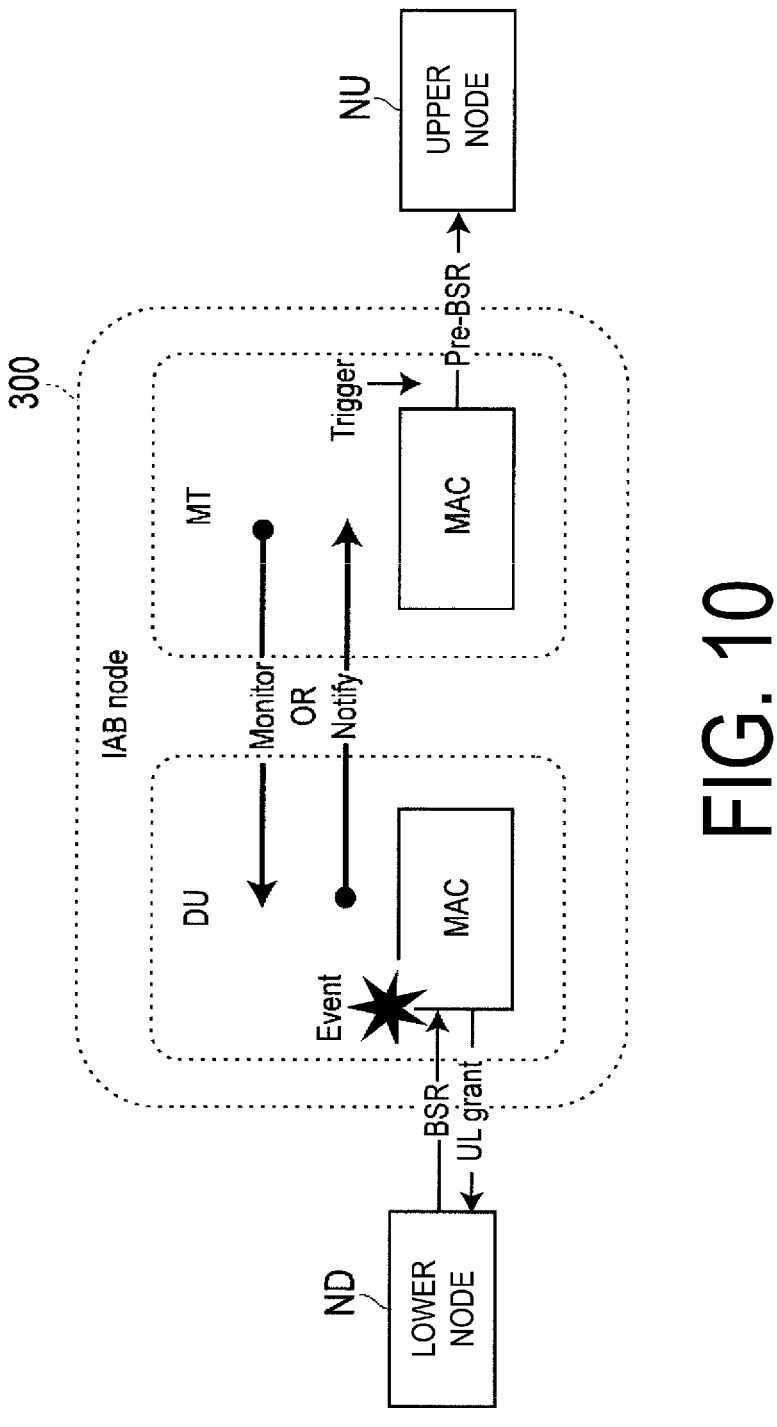
FIG. 10 is a diagram illustrating a transmission trigger for the preemptive BSR according to an embodiment.

Now, a transmission trigger for the preemptive BSR according to an embodiment will be described. FIG. 10 is a diagram illustrating a transmission trigger for the preemptive BSR according to an embodiment. The Pre-BSR in FIG. 10 means the preemptive BSR. Note that the amount of data having yet to be transmitted, indicated by the preemptive BSR, may be a buffer amount reported in the legacy BSR from the lower node, a data amount involved in transmission resource allocation to the lower node by the UL grant, a data amount inferred from statistical information of past transmission data, and/or the like.

As illustrated in FIG. 10, the IAB node 300 includes a DU wirelessly connected to the lower node ND, a MT wirelessly connected to the upper node NU, and relays uplink data from the lower node ND to the upper node NU.

Firstly, in the IAB node 300, the MT detects that a predetermined event (Event) related to resource allocation to the lower node ND has occurred in the DU. The predetermined event includes a first event indicating that the DU has received the BSR from the lower node ND, or a second event indicating that the DU has allocated an uplink radio resource to the lower node ND (in other words, the DU has transmitted the UL grant to the lower node ND).

In a case that the first event is a transmission trigger condition of the preemptive BSR, the upper node NU can receive the preemptive BSR from the IAB node 300 at an earlier stage, and thus the upper node NU can schedule the IAB node 300 with reduced delay. Note that, when the DU transmits the UL grant to the lower node ND after receiving the BSR from the lower node ND depends on implementation, and thus there is likely to be a time gap between the transmission and the allocation timing for the upper node NU.

On the other hand, in a case that the second event is a transmission trigger condition for the preemptive BSR, the upper node NU can more accurately predict the timing when the IAB node 300 can transmit the uplink data. Note that, the scheduling operation for the IAB node 300 performed by the upper node NU is delayed compared to the first event.

Which of the first event and the second event is used as the transmission trigger condition (predetermined event) for the preemptive BSR may be configured for the IAB node 300 in advance or may be specified by the upper node NU. In a case that the specification is made by the upper node NU, the IAB node 300 may receive, from the upper node NU, event configuration information designating one of the first event and the second event as a predetermined event. The event configuration information may be included in an RRC message corresponding to a message from the RRC layer, may be included in an F1 message corresponding to a message from the F1-AP, or may be included in a MAC CE corresponding to a message from the MAC layer.

This enables the upper node NU to designate the predetermined event, and the transmission trigger condition for the preemptive BSR can be selectively used depending on the situation of the upper node NU.

Here, the predetermined event may be designated for each LCG or for each logical channel (LCID). For example, the event configuration information includes information designating the first event for the LCG #1 (or LCID #1) and information designating the second event for the LCG #2 (or LCID #2). Note that whether to enable transmission of the preemptive BSR may be specified for each LCG or for each logical channel (LCID). In this case, the event configuration information includes, for example, information designating the first event for the LCG #1 (or LCID #1) and information indicating that no event is designated for the LCG #2 (or LCID #2).

QoS requirements vary with each LCG or with each logical channel (LCID), and thus, by enabling the predetermined event to be designated for each LCG or for each logical channel (LCID), the transmission trigger condition for the preemptive BSR can be easily adapted to the QoS requirements.

The MT detects the occurrence of the predetermined event by monitoring (Monitor) an event occurring in the DU, or by receiving, from the DU, a notification (Notify) indicating that the predetermined event has occurred. Here, the monitoring may refer to periodic reception of information from the DU, or acquisition of information via an inquiry to (polling of) the DU. The notification is provided from the DU to the MT when the DU detects the occurrence of the predetermined event.

In a case that the predetermined event is designated by the upper node NU, the MT detects the occurrence of the event designated by the event configuration information. In a case that the predetermined event is designated for each of LCGs or for each of the logical channels (LCID) by the upper node NU, the MT detects the occurrence of events designated by the event configuration information for each of the LCGs or for each logical channel (LCID).

The MT detects the occurrence of a predetermined event and acquires, from the DU, at least one of the size information in the BSR received from the lower node ND, the amount of resources allocated to the lower node ND by the UL grant, or the identification information of the corresponding LCG. For example, in a case that the predetermined event is the first event, the MT may acquire the size information in the BSR received from the lower node ND and the LCG identification information corresponding to this size information. In a case that the predetermined event is the second event, the MT may acquire the amount of resources allocated to the lower node ND by the UL grant and the LCG identification information corresponding to the amount of resources.

Secondly, in a case that the MT detects the occurrence of the predetermined event, the MT triggers (Trigger) the transmission of the preemptive BSR, and transmits, to the upper node NU, the preemptive BSR (Pre-BSR) including the size information indicating the amount of uplink data having yet to be transmitted to the upper node NU. In addition to the size information (buffer size field) indicating the amount of uplink data having yet to be transmitted, the preemptive BSR may include the LCG identification information associated with the size information.

Figure 11:
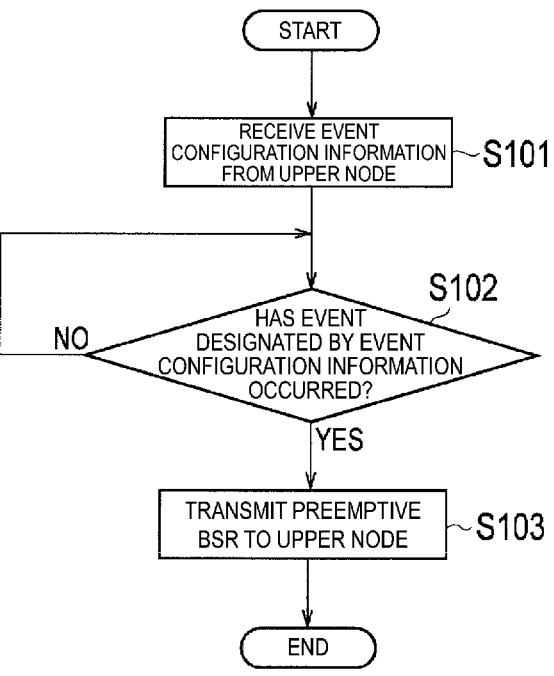
FIG. 11 is a diagram illustrating an example of a transmission operation for the preemptive BSR in an IAB node according to an embodiment.

FIG. 11 is a diagram illustrating an example of a transmission operation for the preemptive BSR in the IAB node 300 according to an embodiment.

As illustrated in FIG. 11, in step S101, the MT of the IAB node 300 receives the event configuration information from the upper node NU. The MT of the IAB node 300 may further receive, from the upper node NU, configuration information specifying a calculation source for the size information (Buffer Size) included in the preemptive BSR. Specifically, for the size information (Buffer Size) reported in the preemptive BSR, the upper node NU may use the configuration information to specify any one of 1) the buffer size of the legacy BSR received from the lower node ND, 2) the amount of resources allocated to the lower node ND by the UL grant, 3) a predicted value based on statistical analysis in the IAB node 300.

In step S102, the MT of the IAB node 300 determines whether the event configured by the event configuration information has occurred in the DU of the IAB node 300. In a case that the event configured by the event configuration information has not occurred in the DU (step S102: NO), the MT waits for the event to occur.

On the other hand, in a case that the event configured by the event configuration information occurs in the DU (step S102: YES), then in step S103, the MT of the IAB node 300 transmits the preemptive BSR to the upper node NU.

Here, transmitting the preemptive BSR may refer to triggering the preemptive BSR. The triggering of the preemptive BSR may refer to initiation of transmission processing such as generation of a preemptive BSR (MAC CE). In this case, when a transmission opportunity occurs (after the transmission resource is allocated by the upper node NU), the MT of the IAB node 300 transmits the preemptive BSR to the upper node NU.

Format Example 1 of Preemptive BSR

Now, Format Example 1 of the preemptive BSR according to an embodiment will be described. FIG. 12 is a diagram illustrating Format Example 1 of the preemptive BSR according to an embodiment.

As illustrated in FIG. 12, in Format Example 1 of the preemptive BSR, the preemptive BSR includes time information (Time) indicating a future timing when the MT can transmit uplink data to the upper node NU. FIG. 12 illustrates two types of formats, i.e., a short preemptive BSR and a long preemptive BSR. Each format is configured as a MAC Control Element (MAC CE) corresponding to a type of message from the MAC layer.

By including such time information in the preemptive BSR, the upper node NU can allocate an uplink radio resource to the IAB node 300 immediately before the timing when the IAB node 300 can transmit the uplink data and can thus perform the appropriate scheduling operation.

The short preemptive BSR includes LCG identification information (LCG ID) identifying the LCG, size information (Buffer Size) indicating the amount of uplink data having yet to be transmitted, the size information corresponding to the LCG, and time information (Time) indicating the timing when the uplink data having yet to be transmitted can be transmitted.

The time information may be information indicating, in terms of the number of subframes, the timing when the uplink data can be transmitted. For example, in a case that the time information includes 3 bits, the time information is configured as follows: "000": four subframes or less, "001": (fifth and subsequent subframes) eight subframes or less, "010": (ninth and subsequent subframes) 16 subframes or less, and "011": (17th and subsequent subframes) 32 subframes or less. The association between each bit string and each timing may be fixed or may be specified by the upper node NU in the RRC message, the F1 message, or the MAC CE.

The long preemptive BSR includes LCG identification information ($LCG_0$ to $LCG_7$) indicating which LCG the size information of which is included, size information for each LCG (Buffer Sizes 1 to m), and time information for each LCG (Times 1 to m). In the illustrated example, the time information is notified for each LCG, and the long preemptive BSR includes m pieces of time information. However, one piece of time information may be common to all LCGs, and the long preemptive BSR may include only one piece of time information. Note that the example of FIG. 12 illustrates the format of the long preemptive BSR in which Buffer Size and Time are adjacent to each other, but that the present embodiment is not limited to this. After m Buffer Sizes, m Times may be placed.

The upper node NU may specify whether to include such time information in the preemptive BSR. The IAB node 300 may receive, from the upper node NU, configuration information specifying whether to include the time information in the preemptive BSR. This configuration information may be included in the RRC message, the F1 message, or the MAC CE. By using the configuration information, the upper node NU may be able to specify which format is to be used by the IAB node 300 to report the preemptive BSR.

In a case that the presence of time information is specified, the MT of the IAB node 300 transmits, to the upper node NU, a preemptive BSR having a format as illustrated in FIG. 12. On the other hand, in a case that the absence of time information is specified, the MT of the IAB node 300 may transmit, to the upper node NU, a preemptive BSR having a format equivalent to that of the legacy BSR (in other words, a format with no Time field).

Whether to include the time information in the preemptive BSR may be specified for each LCG or for each logical channel (LCID). For example, the configuration information includes information specifying the presence of time information for LCG #1 (or LCID #1) and information specifying the absence of time information for the LCG #2 (or LCID #2).

The upper node NU may specify which size information (Buffer Size) of timing is to be included in the preemptive BSR. For example, the configuration information may include information ("000" in the example described above) specifying that the size information (Buffer Size) within four subframes is included in the preemptive BSR. Such a specification may be made for each LCG or for each logical channel (LCID).

Figure 13:
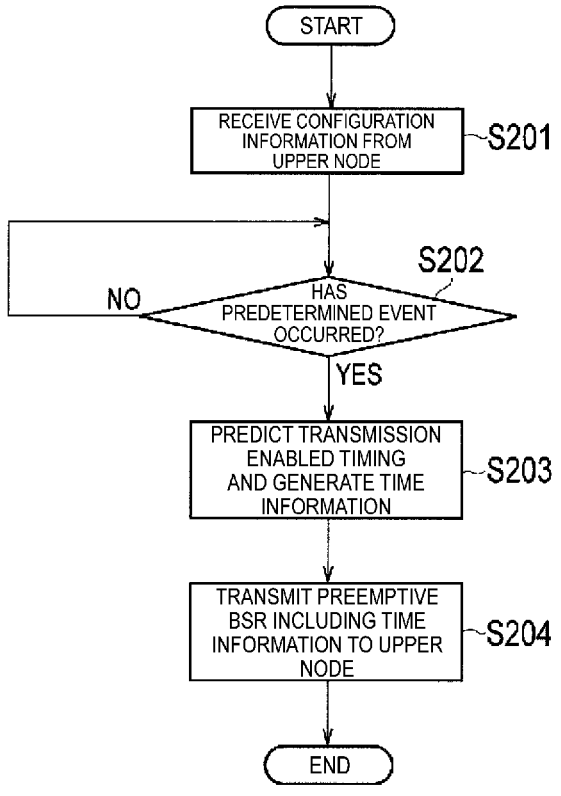
FIG. 13 is a diagram illustrating an example of a transmission operation for the preemptive BSR in the IAB node according to an embodiment.

FIG. 13 is a diagram illustrating an example of a transmission operation for the preemptive BSR in the IAB node 300 according to an embodiment.

As illustrated in FIG. 13, in step S201, the MT of the IAB node 300 receives configuration information from the upper node NU. Here, the MT of the IAB node 300 is assumed to have received configuration information for specifying that the time information is included in the preemptive BSR. The configuration information may include the event configuration information described above.

In step S202, the MT of the IAB node 300 determines whether the predetermined event has occurred in the DU of the IAB node 300. In a case that the predetermined event has not occurred in the DU (step S202: NO), the MT waits for the event to occur.

On the other hand, in a case that the predetermined event occurs in the DU (step S202: YES), then in step S203, the MT of the IAB node 300 predicts the timing when the uplink data can be transmitted to the upper node NU. For example, in a case where the predetermined event is the first event (BSR is received from the lower node ND), the MT of the IAB node 300 determines when to transmit the UL grant to the lower node ND, and considers that the MT receives the uplink data from the lower node ND a certain time after the transmission of the UL grant. Then, the MT of the IAB node 300 predicts the timing when the uplink data can be transmitted to the upper node NU in consideration of a delay in the internal processing in the IAB node 300. The MT of the IAB node 300 generates time information indicating the predicted timing.

In step S204, the MT of the IAB node 300 transmits, to the upper node NU, a preemptive BSR including the time information generated in step S203.

Format Example 2 of Preemptive BSR

Now, Format Example 2 of the preemptive BSR according to an embodiment will be described. FIG. 14 is a diagram illustrating Format Example 2 of the preemptive BSR according to an embodiment. Format Example 2 may be used in combination with Format Example 1 described above.

As illustrated in FIG. 14, in the present example, the upper node NU variably configures the upper limit of the amount of uplink data having yet to be transmitted, which amount can be indicated by the size information included in the preemptive BSR. For example, in a case that the upper limit defined by the communication standard for the mobile communication system 1 is 150 kB, the upper node NU specifies the upper limit as 100 kB.

The upper node NU may specify the upper limit of the amount of data, indicated by the size information, to the IAB node 300 as a numerical value (direct value) such as 100 kB, or may specify the upper limit of the amount of data, indicated by the size information, to the IAB node 300 as an index value (e.g., "00010100"). In this manner, the upper node NU specifies the upper limit of the amount of uplink data having yet to be transmitted, which can be reported in the preemptive BSR by the IAB node 300. For example, the upper node NU specifies the upper limit in the RRC message, the F1 message, or the MAC CE. Such an upper limit value may be configured for each LCG or for each LCID. In a case that the upper limit is configured for each LCID, the largest upper limit value of the upper limit values for each of the plurality of LCIDs included in a certain LCG may be considered as the upper limit value of the LCG.

FIG. 14 illustrates long BSR formats for cases where the upper limit is set to "00001111" and to "00000111" on the assumption that the size information originally includes 8 bits.

In a case that the upper limit is set to "00001111", the upper 4 bits "0000" are always fixed, thus eliminating the need for notification. Thus, by reducing the size information (Buffer Size) to only lower 4 bits, the size information, otherwise formed of 8 bits, includes a half number of, that is, 4 bits. Consequently, the number of bits can be reduced.

On the other hand, in a case that the upper limit is set to "00000111", the upper 5 bits "00000" are always fixed, thus eliminating the need for notification. Accordingly, by reducing the size information (Buffer Size) to only lower 3 bits, the size information, otherwise formed of 8 bits, can be reduced to 3 bits.

The upper node NU can imply the expected amount of UL grant (actual resource allocation) for the IAB node 300, and the IAB node 300 can optimize scheduling for the lower node ND.

Figure 15:
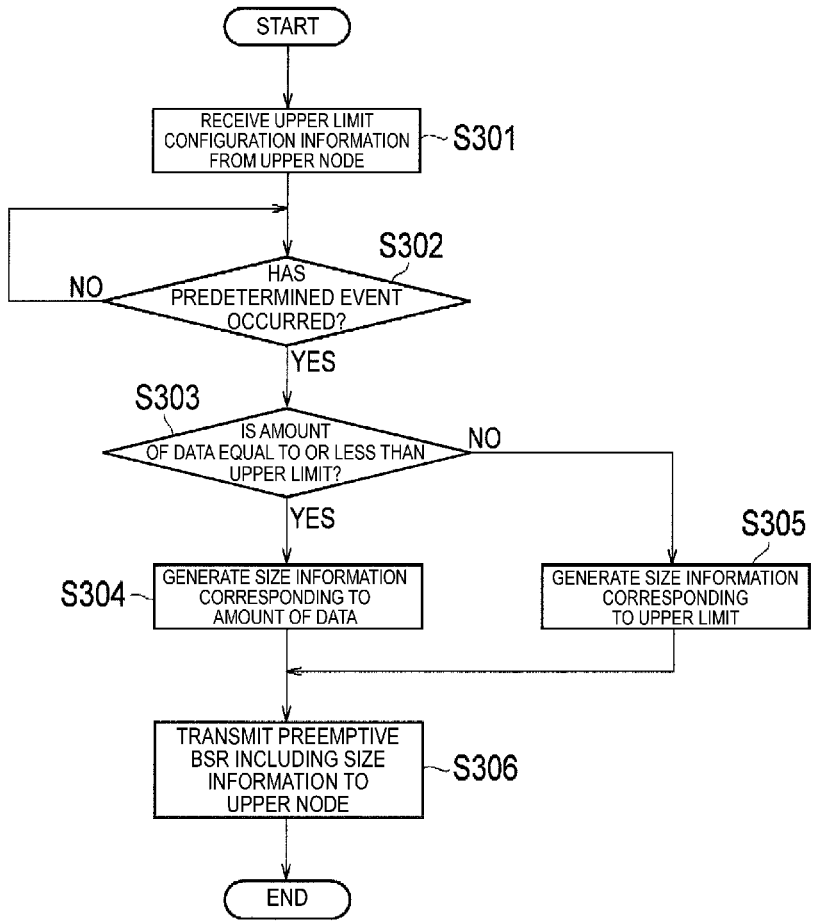
FIG. 15 is a diagram illustrating an example of a transmission operation for the preemptive BSR in the IAB node according to an embodiment.

FIG. 15 is a diagram illustrating an example of a transmission operation for the preemptive BSR in the IAB node 300 according to an embodiment.

As illustrated in FIG. 15, in step S301, the MT of the IAB node 300 receives upper limit configuration information from the upper node NU. The upper limit configuration information includes information specifying the upper limit of the amount of uplink data having yet to be transmitted, which amount is indicated by the size information.

In step S302, the MT of the IAB node 300 determines whether the predetermined event has occurred in the DU of the IAB node 300. In a case that the predetermined event has not occurred in the DU (step S302: NO), the MT waits for the event to occur.

On the other hand, in a case that the predetermined event occurs in the DU (step S302: YES), in step S303, the MT of the IAB node 300 determines whether the amount of uplink data having yet to be transmitted is equal to or less than the upper limit. In a case that the amount of uplink data having yet to be transmitted is equal to or less than the upper limit (step S303: YES), in step S304, the MT of the IAB node 300 generates size information corresponding to the amount of uplink data having yet to be transmitted.

On the other hand, in a case that the amount of uplink data having yet to be transmitted exceeds the upper limit (step S303: NO), then in step S305, the MT of the IAB node 300 generates size information corresponding to the upper limit.

In step S306, the MT of the IAB node 300 transmits, to the upper node NU, a preemptive BSR including the size information generated. In this way, the MT of the IAB node 300 transmits a preemptive BSR including size information indicating the amount of uplink data having yet to be transmitted, the amount being equal to or less than the upper limit specified by the upper limit configuration information.

Multi-Connectivity Scenario

Figure 16:
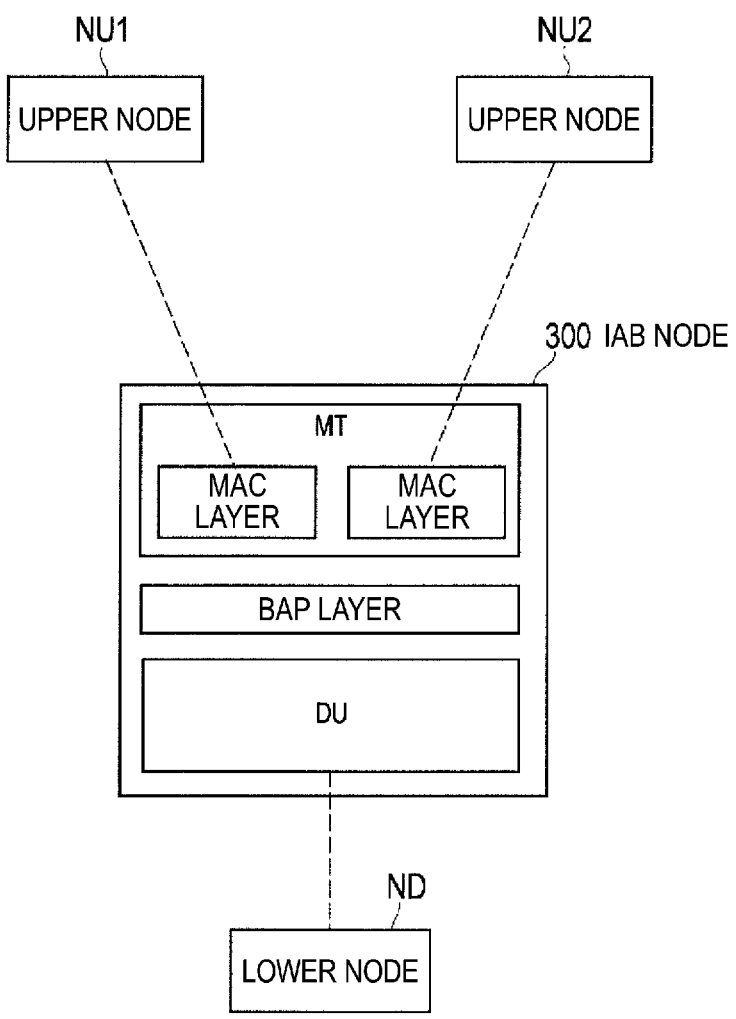
FIG. 16 is a diagram illustrating a multi-connectivity scenario according to an embodiment.

Now, a multi-connectivity scenario according to an embodiment will be described. FIG. 16 is a diagram illustrating the multi-connectivity scenario according to an embodiment.

As illustrated in FIG. 16, the MT of the IAB node 300 is wirelessly connected to a plurality of upper nodes. Although two upper nodes NU1 and NU2 are illustrated in FIG. 16, the MT of the IAB node 300 may be wirelessly connected to three or more upper nodes. The upper node NU1 may be the gNB 200 (or eNB) or may be the upper IAB node 300. The upper node NU2 may be the gNB 200 (or eNB) or may be the upper IAB node 300.

For example, it is mainly assumed that the upper node NU1 is a master node, whereas the upper node NU2 is a secondary node. The upper node NU1 manages the Master Cell Group (MCG) of the MT of the IAB node 300. The upper node NU2 manages the Secondary Cell Group (SCG) of the MT of the IAB node 300.

The MT of the IAB node 300 includes a plurality of MAC layers communicating with a plurality of upper nodes NU. Specifically, the MT of the IAB node 300 includes a MAC layer corresponding to the upper node NU1 (MCG) and a MAC layer corresponding to the upper node NU2 (SCG). The MAC layer corresponding to the upper node NU1 can transmit the preemptive BSR to the upper node NU1. The MAC layer corresponding to the upper node NU2 can transmit the preemptive BSR to the upper node NU2.

In such a multi-connectivity scenario, in a case of detecting occurrence of a predetermined event, the MT of the IAB node 300 transmits, by the MAC layer selected from the plurality of MAC layers, the preemptive BSR to the upper node NU corresponding to the MAC layer selected.

For example, the DU of the IAB node 300 receives, from the lower node ND, a BSR including identification information (LCG identification information) indicating a logical channel group associated with the size information. The BSR received from the lower node ND may be a legacy BSR or may be a preemptive BSR. Based on the LCG identification information included in the BSR from the lower node ND, the IAB node 300 selects, from the plurality of MAC layers, the MAC layer that transmits the preemptive BSR.

In a first method for selecting the MAC layer that transmits the preemptive BSR, the IAB node 300 selects the MAC layer that transmits the preemptive BSR based on a delay request (QoS requirement) from the LCID linked with the LCG in the BSR from the lower node ND. For example, in a case that the LCID linked with the LCG in the BSR from the lower node ND requires low delay, the IAB node 300 selects the MAC layer corresponding to the upper node NU1 or the master node out of the upper nodes NU1 and NU2, the upper node NU1 or the master node being in a favorable communication state. Then, the selected MAC layer transmits the preemptive BSR. On the other hand, in a case that the LCID linked with the LCG in the BSR from the lower node ND does not request low delay (delay-tolerant), the IAB node 300 may determine not to transmit the preemptive BSR with no MAC layer selected.

In a second method for selecting the MAC layer that transmits the preemptive BSR, the IAB node 300 may select the MAC layer that transmits the preemptive BSR based on the LCID linked with the LCG in the BSR from the lower node ND and routing information for associating the LCID with the upper node (CG: Cell Group). This routing information may be information managed by the BAP layer. Specifically, the IAB node 300 selects the MAC layer for the upper node associated with the LCID linked with the LCG in the BSR from the lower node ND, and the selected MAC layer transmits the preemptive BSR.

In an embodiment, in a case that a Radio Link Failure (RLF) occurs between any one of the plurality of upper nodes and the IAB node 300, the IAB node 300 may exclude, from the selection targets, the MAC layer corresponding to the upper node in which the RLF is occurring. Note that the occurrence of the RLF may be detected by the MT of the IAB node 300, and the RLF may be notified from the MT to the DU.

In an embodiment, the IAB node 300 may transmit the preemptive BSR to two or more upper nodes. For example, the IAB node 300 transmits the preemptive BSR to both master node (MCG) and secondary node (SCG) in a case that the master node (MCG) is not in a favorable radio state. This allows resource allocation to be received from the secondary node (SCG).

Other Embodiments

In the above-described embodiments, as a method of distinguishing the legacy BSR from the preemptive BSR, the distinction can be made based on a difference in the format of the BSR. However, the IAB node 300 may include, in the preemptive BSR, an identifier for identifying the preemptive BSR. For example, by including a logical channel ID (LCID) defined for the preemptive BSR in a header portion (MAC subheader) transmitted together with the BSR MAC CE, the IAB node 300 may identify the preemptive BSR to the upper node.

Figure 17:
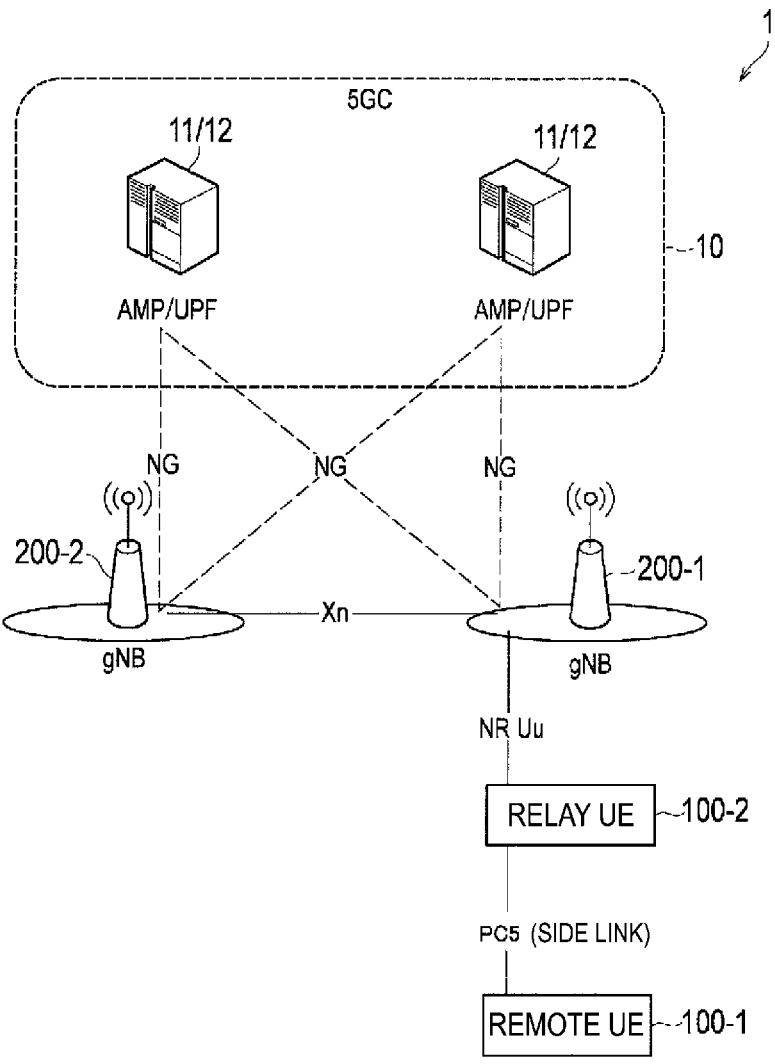
FIG. 17 is a diagram illustrating a modified example of the mobile communication system.

In the embodiment described above, an example is described in which the relay node is the IAB node 300. The relay node may be a relay UE. FIG. 17 is a diagram illustrating a modified example of the mobile communication system 1. As illustrated in FIG. 17, the mobile communication system 1 includes a 5GC 10, gNBs 200-1 and 200-2, a remote UE 100-1, and a relay UE 100-2. The relay UE 100-2 is an example of a relay node. The remote UE 100-1 is an example of a lower node, and the gNB 200-1 is an example of an upper node. The remote UE 100-1 communicates with the relay UE 100-2 via a PC5 interface (side link) corresponding to an inter-UE interface. The relay UE 100-2 communicates with the gNB 200-1 via an NR Uu wireless interface. As a result, the remote UE 100-1 communicates indirectly with the gNB 200-1 via the relay UE 100-2.

In the embodiments described above, an example has been mainly described, in which the mobile communication system 1 is a 5G mobile communication system. However, the base station in the mobile communication system 1 may be an eNB used as an LTE base station. The core network in the mobile communication system 1 may be an Evolved Packet Core (EPC). Furthermore, the gNB can also be connected to the EPC, the eNB can also be connected to the 5GC, and the gNB and the eNB can also be connected via an inter-base station interface (Xn interface, X2 interface).

A program that causes a computer to execute each of the processing operations according to the embodiments described above may be provided. The program may be recorded in a computer-readable medium. Use of the computer-readable medium enables the program to be installed on a computer. Here, the computer-readable medium on which the program is recorded may be a non-transitory recording medium. The non-transitory recording medium is not particularly limited, and may be, for example, a recording medium such as a CD-ROM, a DVD-ROM, or the like. A chip set may be provided that includes a memory that stores a program for executing each of the processing operations performed by the UE 100, the gNB 200, or the IAB node 300 and a processor that executes the program stored in the memory.

Supplementary Note

Introduction

A WID has been approved that is related to Integrated Access and Backhaul (IAB) including support of low latency scheduling in a multi-hop network. As a result of broad discussions, RAN2 has agreed to specify the preemptive BSR as follows:

A new BSR (new format) is specified for the preemptive BSR.

For the new BSR:

Available data (the same as that in the current format) and expected data are distinguished from each other in the BSR.

The association between the LCH and the preemptive BSR is left to implementations unless problems are identified that require normative solutions.

Further studies are required to determine whether an SR and a BSR generated by a MAC entity need to be reported only to a parent node for which a peer of the MAC entity is present or whether the SR and the BSR can be reported exclusively to the parent node.

For a trigger for the preemptive BSR, a text similar to that in the current agreement can be captured in stage 3/2. Accurate timings and the like depend on implementations.

Furthermore, the text proposals in TS38.321 were "approved as a baseline except for formats requiring further studies".

This supplementary note discusses remaining problems with the preemptive BSR.

Discussion

Multi-Connectivity Scenario

The multi-connectivity scenario is taken into account to allow the IAB to achieve higher reliability and/or throughput. In this scenario, the MT includes two MAC entities, and thus the legacy BSR procedure is completely separated between the MCG and the SCG, and the buffer size in each BSR is reported by the upper layer and based on the amount of data buffered by MAC. This principle is also maintained for the preemptive BSR. This is because the operation is part of the legacy procedure captured in TS38.321.

The IAB node has difficulty in determining the route of an expected data packet. In other words, the legacy BSR from the child includes no information related to the BAP routing ID, and thus the problem is which CG the preemptive BSR needs to be reported to. In one simple solution, the preemptive BSR is not supported in the multi-connectivity scenario. However, this also means that scheduling delay occurs in such a network topology, in other words, the IAB cannot achieve high reliability and low latency at the same time. To support services of a URLLC type such as IIoT UE, the scheduling delay should be minimized in the multi-connectivity scenario.

Proposal 1: RAN2 should agree that the preemptive BSR is also supported in the multi-connectivity scenario.

According to the current texts in TS 38.321, occurrence of an event may trigger a preemptive BSR.

In other words, occurrence of any of the following events may trigger a BSR for a particular case of the IAB-MT in a case that this processing is configured in advance.

UL grant is provided to a child IAB node or a UE.

A BSR is received from the child IAB node or the UE.

This BSR is referred to as a "preemptive" BSR and treated as a normal BSR for the purpose of an SR trigger.

This text can be interpreted as meaning that the MAC entity monitors whether an event occurs in the DU and that catching the event may trigger a preemptive BSR. In this modeling, two MAC entities involved in multi-connectivity may always trigger a preemptive BSR, in other words, create a double report for the MCG and SCG.

Observation 1: For the current modeling, a possible interpretation is that the MAC of the MT monitors whether an event (in other words, reception of a BSR or provision of UL grant) occurs in the DU.

Observation 2: In the multi-connectivity scenario, the current modeling (that is, Observation 1) may cause the double report for both the MCG and the SCG.

Instead, another modeling can be studied in which, when any of these events occurs, the DU notifies the MAC of the MT of the event. It is also easy for the DU to simultaneously notify the MT of the expected amount of data. Thus, which MAC entity, that is, which of the MCG and the SCG the reporting is intended for and what amount of data is reported in the preemptive BSR may depend on the implementation of the DU. The dependence on the implementation of the DU may involve the determination made based not only on the delay requirement of the LCH associated with the LCG in the BSR reported from the child, but also on the situation of the backhaul to the parent to avoid the backhaul link or the LTE MCG link in which the RLF is detected, for example.

Note that this is not intended to exclude the DU notifying both MAC entities, in other words, to exclude the double report.

Observation 3: It may be easier to assume that, in a case that one of the two events occurs in the DU (in other words, reception of a BSR or provision of UL grant), the MAC of the MT may be notified from the DU.

Proposal 2: RAN2 should agree that, in the multi-connectivity scenario, which MAC entity in the MT is notified of an event and the associated expected amount of data depends on the implementation of the DU.

Proposal 3: In a case that Proposal 2 can be agreed with, then in response to the agreement, the TP should be updated, for example, as in Appendix.

FIG. 10 is a diagram illustrating monitoring for and notification of occurrence of an event.

Regardless of whether the model in Observation 1 or the model in Observation 3 is involved, the aspect of configurations can also be taken into account. The current TP starts with "in a case that this processing is configured in advance", the text itself successfully captures the agreement that "the network can provide a configuration as to whether the preemptive BSR is used in the IAB nodes (by using a MAC configuration in RRC)". This clearly covers activation/deactivation of the preemptive BSR for each CG.

The intention of this configuration is to enable, for example, "prevention of wasting of resources, function test, and troubleshooting". In this sense, the network should further be capable of providing a configuration as to which event (in other words, provision of UL grant and/or reception of a BSR) is activated/deactivated to trigger the preemptive BSR.

Proposal 4: RAN2 should agree that the network can also provide a configuration as to which event is used as a trigger for the preemptive BSR.

MAC CE Format

The Current TP is intended to reuse the same MAC CE format as that for the legacy BSR. However, RAN2 has agreed to "specify a new BSR for the preemptive BSR (in a new format)", and thus the MAC CE format still needs be further studied.

The original intention of the new format is to include, in one MAC CE, both the amount of data buffered and the expected amount of data. However, the parent IAB node may be capable of estimating the amount of data buffered using the legacy BSR (e.g., "current amount of data buffered"="buffer size reported in last BSR"-"amount of data already transmitted"). Consequently, including, in the preemptive BSR, in other words, in the new format, the amount of data buffered is not very useful.

Observation 4: The parent IAB node can determine the current amount of data buffered by using only the legacy BSR.

Another intention was to distinguish the expected amount of data from the amount of data buffered. However, as intended in the current TP, even in a case that the legacy format is reused, the new LCID (that is, "51" in TS 38.321) may be used for the distinction.

Observation 5: The expected data can be distinguished by using the new LCID for the preemptive BSR, in other words, without using a new format.

In addition to these observations, in a case that RAN2 still sticks to the above-described agreement, in other words, in a case that RAN2 sticks to specification of a new format for the preemptive BSR, the new format is useless that is actually the same as the MAC CE for the legacy BSR. Some expansions should be studied.

Some companies are concerned about wasting of resources caused by timing inconsistency, and thus one type of expansion corresponds to inclusion of timing information indicating when the expected data can be transmitted. RAN2 has already agreed that "the exact timing and the like depend on implementations". However, the timing information can be included in the format. That is, the exact timing information configured in the new format depends on the implementation of the DU.

Nevertheless, whether RAN2 sticks to specification of a new format as a MAC CE for the preemptive BSR should be checked first.

Proposal 5: RAN2 should discuss whether to stick to specification of a new format for the preemptive BSR.

Proposal 6: In a case that a new format is specified, RAN2 should discuss how to expand the new format of the preemptive BSR in comparison with the MAC CE of the legacy BSR.

APPENDIX

In a case that Proposal 3 can be agreed with, the text proposals may be updated as follows.

The BSR may also be triggered in a case that any of the events described below is notified to the IAB-MT along with the corresponding expected amount of data, in a case that this processing is configured in advance.

UL grant is provided to the child IAB node or the UE.

A BSR is received from the child IAB node or the UE.

This BSR is referred to as a "preemptive" BSR and treated as a normal BSR for the purpose of the SR trigger.

The invention claimed is:

1. A communication control method using a relay node comprising a first functional unit configured to connect wirelessly to a lower node and a second functional unit configured to connect wirelessly to an upper node, the relay node relaying data from the lower node to the upper node, the communication control method comprising:

detecting, by the second functional unit, that an event related to resource allocation to the lower node has occurred in the first functional unit;

transmitting, by the second functional unit, to the upper node, in a case of detecting occurrence of the event, a first buffer state report including size information indicating an amount of data having yet to be transmitted to the upper node, and receiving, by the relay node, from the upper node, event configuration information designating a predetermined event, wherein the detecting includes detecting the occurrence of the event by monitoring an event occurring in the first functional unit, or by receiving, from the first functional unit, a notification indicating that the event has occurred, and determining whether the event that has occurred is the predetermined event designated by the event configuration information received from the upper node, and the transmitting includes transmitting, to the upper node, the first buffer state report in response to determining that the event that has occurred is the predetermined event designated by the event configuration information received from the upper node.

2. The communication control method according to claim 1, wherein the predetermined event includes a first event indicating that the first functional unit receives a second buffer state report from the lower node, or a second event indicating that the first functional unit allocates an uplink radio resource to the lower node.

3. The communication control method according to claim 1, further comprising predicting, by the relay node, a timing in future when the second functional unit is enabled to transmit, to the upper node, the data having yet to be transmitted, wherein the transmitting includes transmitting the first buffer state report further including time information indicating the timing predicted.

4. The communication control method according to claim 1, further comprising receiving, by the relay node, from the upper node, upper limit configuration information specifying an upper limit of the amount of data having yet to be transmitted that is indicated by the size information, wherein the transmitting includes transmitting the first buffer state report including the size information indicating the amount of data having yet to be transmitted that is equal to or less than the upper limit specified by the upper limit configuration information.

5. The communication control method according to claim 1, further comprising communicating, by a plurality of Medium Access Control (MAC) layers of the second functional unit, with a plurality of upper nodes, wherein the transmitting includes transmitting, by a MAC layer selected from among the plurality of MAC layers, in a case where the second functional unit detects the occurrence of the predetermined event, the first buffer state report to an upper node of the plurality of upper nodes corresponding to the MAC layer selected.

6. The communication control method according to claim 5, further comprising:

receiving, by the relay node, from the lower node, a third buffer state report including identification information indicating a logical channel group associated with the size information; and selecting, by the relay node, based on the identification information included in the third buffer state report, the MAC layer transmitting the first buffer state report from among the plurality of MAC layers.

7. A relay node relaying data from a lower node to an upper node, the relay node comprising:

a first functional unit configured to connect wirelessly to the lower node; and a second functional unit configured to connect wirelessly to the upper node, wherein the second functional unit is configured to execute processing for detecting that an event related to resource allocation to the lower node has occurred in the first functional unit, processing for transmitting, to the upper node, in a case of detecting occurrence of the event, a first buffer state report including size information indicating an amount of data having yet to be transmitted to the upper node, and processing for receiving, from the upper node, event configuration information designating a predetermined event, the processing for detecting includes processing for detecting the occurrence of the event by monitoring an event occurring in the first functional unit, or by receiving, from the first functional unit, a notification indicating that the event has occurred, and processing for determining whether the event that has occurred is the predetermined event designated by the event configuration information received from the upper node, and the processing for transmitting includes transmitting, to the upper node, the first buffer state report in response to determining that the event that has occurred is the predetermined event designated by the event configuration information received from the upper node.

* * * * *